United States Patent [19]
Lendaro

[11] Patent Number: 5,017,844
[45] Date of Patent: May 21, 1991

[54] DISABLING ARRANGEMENT FOR A CIRCUIT OPERATING AT A DEFLECTION RATE

[75] Inventor: Jeffery B. Lendaro, Noblesville, Ind.

[73] Assignee: RCA Licensing Corporation, Princeton, N.J.

[21] Appl. No.: 516,384

[22] Filed: Apr. 30, 1990

[51] Int. Cl.$^5$ .................. H01J 29/70; H01J 29/76
[52] U.S. Cl. .................. 315/408; 315/399; 358/194.1
[58] Field of Search .................. 315/408, 411, 399; 358/190, 194.1

[56] References Cited

U.S. PATENT DOCUMENTS

| | | |
|---|---|---|
| 4,282,460 | 8/1981 | Luz et al. |
| 4,532,457 | 7/1985 | Haferl .................. 315/411 |
| 4,734,771 | 3/1988 | Lendaro et al. |

OTHER PUBLICATIONS

An Application Note entitled, Tea 2260 High Performance Driver Circuit for SMPS, dated Apr. 1989.
A Data Sheet Entitled, Tea 5170 Switch Mode Power Supply Secondary Circuit, dated Jan. 1989.

*Primary Examiner*—Theodore M. Blum
*Attorney, Agent, or Firm*—Joseph S. Tripoli; Joseph J. Laks; Sammy S. Henig

[57] ABSTRACT

Active turn-off or disabling circuits respond to control signals from a control unit which defines the mode of operation of a receiver. In response to a designation of a standby mode of operation the active disabling unit actively disables a pulse width modulator to prevent pulses from being produced based upon an input of ringing signal. In addition, the active disabling circuits prevent such ringing signal from negatively effecting pincusion protection circuits. The ringing signal is produced in a horizontal flyback transformer during a transition interval that follows a transition to standby mode of operation.

4 Claims, 2 Drawing Sheets

DISABLING ARRANGEMENT FOR A CIRCUIT OPERATING AT A DEFLECTION RATE

The present invention is related to a video display apparatus. In particular, the present invention is directed to a circuit for actively disabling, for example, a pulse-width-modulator and a pincushion distortion correction circuit in a television receiver in order to prevent ringing signals from producing damage to circuit components.

It is known to provide a television receiver which is capable of operating in a standby mode and in a power-on, run or normal mode. In the normal mode, the television receiver operates to process video and audio signals and to display those signals. In a standby mode the deflection stages are disabled. However, a microprocessor of a remote control circuit is powered and set for operation but the receiver does not process or display video or audio signals.

In a circuit embodying an aspect of the invention, a switch mode power supply primary circuit regulates output supply voltages by sensing corresponding voltages produced at either the primary side of an isolation chopper transformer that is referenced to a "hot" ground or at a secondary side of the chopper transformer that is referenced to a "cold" ground, depending upon the mode of operation selected by the user. The primary circuit is a regulator circuit portion that is at the primary side.

The selection of either the standby mode or the normal mode is indicated to the switch mode power supply primary circuit by the presence of an output signal of a pulse width modulator which is at the secondary side and which is coupled to an input of the switch mode power supply primary circuit. The output of the pulse width modulator in the normal mode are pulses at the horizontal line rate with a duty cycle that is variable depending on the condition. When pulses are received at the primary circuit, this indicates to the primary circuit that a normal mode of operation is required. The primary circuit produces an output signal, which is in part dependent upon the pulses received from the pulse width modulator. The output signal controls a chopper transistor of a chopper circuit that is coupled to the chopper transformer. Voltages produced at secondary windings of the transformer are rectified to produce supply voltages that are referenced to the cold ground. The magnitude of a given supply voltage is dependent upon the pulse width of the pulses received at the input of the primary circuit. The primary circuit also includes an over current detector for detecting an over current condition in the chopper transistor.

In the standby mode, the pulse width modulated signal is disabled. The primary circuit detects the absence of the modulated signal and then regulates off the primary side of the transformer that is referenced to "hot" ground, in the standby mode.

The output supply voltages are utilized to supply power to various low voltage loads in the receiver. A supply voltage B+ of the output supply voltage provides power to a horizontal output circuitry. The output supply voltages are produced in both the standby and normal modes.

A typical horizontal deflection output stage of a television receiver, for example, includes a flyback transformer. A primary winding of the flyback transformer is coupled to a deflection switch responsive to a horizontal rate control signal that is obtained from a horizontal oscillator and driver stage. The switch operates at the horizontal frequency in normal mode. A deflection winding forms with a capacitor or resonant circuit that is also coupled to the deflection switch.

During normal mode of operation, the deflection switch produces switching operation and develops a voltage at the horizontal frequency across the primary winding. A retrace voltage at the horizontal frequency is also developed in a secondary winding of the flyback transformer by a transformer action.

In the television receiver, embodying an aspect of the invention, the horizontal rate voltage at the secondary winding, hereinafter referred to as the switching signal, is used for providing switching operation at the horizontal rate. The switching operation is provided in various circuits, for example, in the pulse-width-modulator of the power supply and in an East-West pincushion distortion correction circuit.

Standby mode of operation is accomplished by disabling the horizontal oscillator when an on/off signal at an OFF state is provided by the remote control circuit. The horizontal oscillator generates, in normal mode, a horizontal rate control signal that produces switching in the deflection switch. Immediately after the horizontal oscillator is disabled, deflection energy is still stored in capacitors and inductances of the deflection circuit output stage such as at the deflection winding. Therefore, during an interval that may last a few milliseconds following the instant when the horizontal oscillator is disabled, ringing at a frequency of, for example, 3 KHZ having a gradually diminishing amplitude can be produced in the aforementioned switching signal that is developed at the secondary winding of the flyback transformer. This switching signal is fed to the pulse width modulator (PWM) which supplies a regulator control input signal to the switch mode regulator primary circuit, as explained before. It is also fed to the switch mode pincushion distortion correction circuit. If the ringing in the switching signal were permitted to affect the pulse width modulator, the modulator would have produced wide pulses at a low frequency as a result of the ringing, that are substantially wider and at a lower frequency than in normal mode. The pulse width modulator provides such pulse signals to the switch mode power supply primary circuit which in turn controls the chopper transistor by way of the output signal, as explained before. An abnormally large current might have been produced in the chopper transistor because of the abnormally wide pulses. This, disadvantageously could trip an over current shut down protection circuit, thereby disabling the power supply and removing the power from the remote control receiver.

As described above, the presence or absence of pulses at an input of the primary circuit is the determining factor to that primary circuit as to selecting the operational mode. Therefore, disadvantageously, the ringing could cause the primary circuit not to change states to operate at the standby mode and could over time, due to large currents in the chopper transistor, damage that transistor and/or adversely affect the microprocessor because of a supply voltage drop.

Furthermore, since the switching signal developed at the secondary of the flyback transformer is also used for controlling the switch mode pincushion circuit, wide pulses caused by the ringing could have produced wide current pulses in a transistor associated with the pincushion circuit. Such current pulses might have damaged that pincushion circuit transistor unless more expensive transistor were used having power tolerance prescribed at a high enough level.

In accordance with an aspect of the present invention, an active turnoff circuit disables the output ringing related pulses produced by the pulse width modulator after a transition to the standby mode. In addition, an active turnoff circuit is provided so as to cut off or prevent the ringing in the switching signal from causing a damage to the transistor associated with the pincushion circuit.

BRIEF DESCRIPTION OF THE DRAWINGS

FIG. 1b illustrates a second portion of a receiver circuit including an embodiment of the present invention which circuit is coupled to the circuit of FIG. 1a.

DETAILED DESCRIPTION OF THE PRESENT INVENTION

Figure 1A:
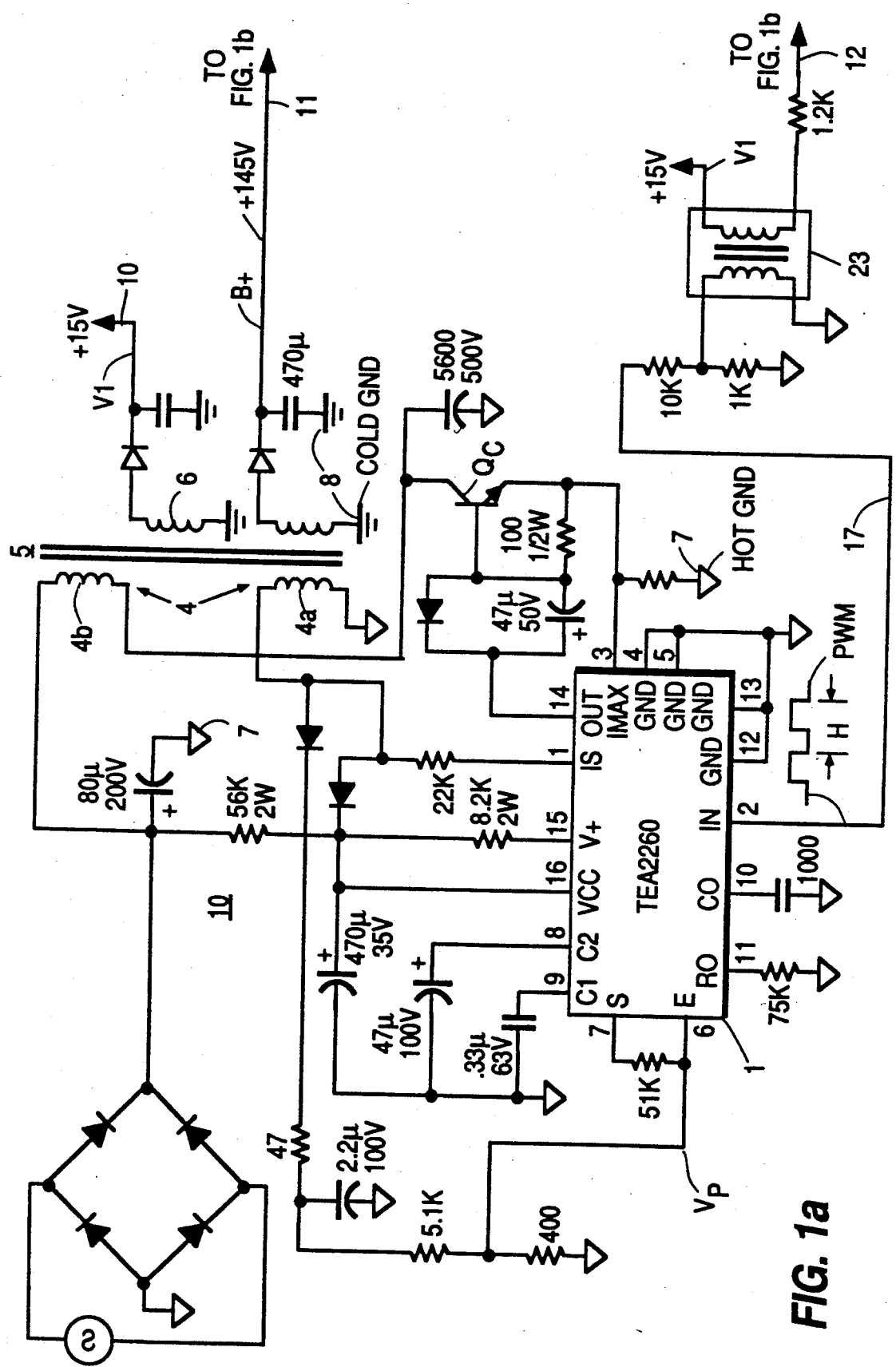
FIG. 1a illustrates a first portion of a television receiver circuit to be utilized together with circuitry according to a first embodiment of the present invention.

FIG. 1a illustrates a first portion of a television receiver circuit. A power supply primary circuit 10, operating as a switch mode regulator control stage, includes a type TEA 2260 integrated circuit 1 which has a plurality of terminals or connections. Connection 2 is coupled via resistors to one side of an isolation transformer 23 that is referenced to "hot" ground 7. The other side of the transformer has its windings coupled to a 15 volt supply voltage V1 that is referenced to a "cold" ground 8 and also, via a resistor to a second portion of the receiver circuit which is illustrated in FIG. 1b and which includes a pulse width modulator circuit 31.

The primary circuit 10 operates to regulate or control the supply voltage from either the primary or secondary side of a main chopper transformer 5. The primary side is referenced to hot ground 7 while the secondary is referenced to cold ground 8. Such a circuit has a standby mode of operation and a power-on, normal or run mode of operation. In the normal mode of operation the primary circuit 10 regulates from a voltage that is sensed at the secondary side. Output signals from a connection 14 control chopper transistor $Q_C$. When the receiver is in the standby mode of operation, the primary circuit 10 regulates from a voltage developed in a winding of the hot side 4 of the transformer 5 by producing signals at connection 14, an output pin of the switch mode regulator control circuit. One such available control circuit is the TEA 2260 integrated circuit available from SGS Thomson. This control circuit regulates a voltage supply that is referenced either to the hot ground or to the cold ground depending upon the input at pin 2. That is, the presence or absence of pulses from the pulse width modulator 31, which is a component of the second portion of the receiver circuit illustrated in FIG. 1b, determines whether the primary circuit operates in either the standby mode of operation or the normal mode of operation. When no pulses are received, then the primary circuit operates in the standby mode, thereby regulating from the hot side of the main transformer 5. However, when such pulses are present at the input pin 2, the primary circuit will operate in the normal mode of operation producing an output signal that controls the chopper transistor. The output signal at terminal 14 has pulse width that is related to that of the pulses received at the input terminal 2 thereby regulating from the cold side of the main transformer. Pin 3 detects the chopper transistor current and determines if that current exceeds a maximum value. If it does, the primary circuit goes into over current shutdown.

Figure 1B:
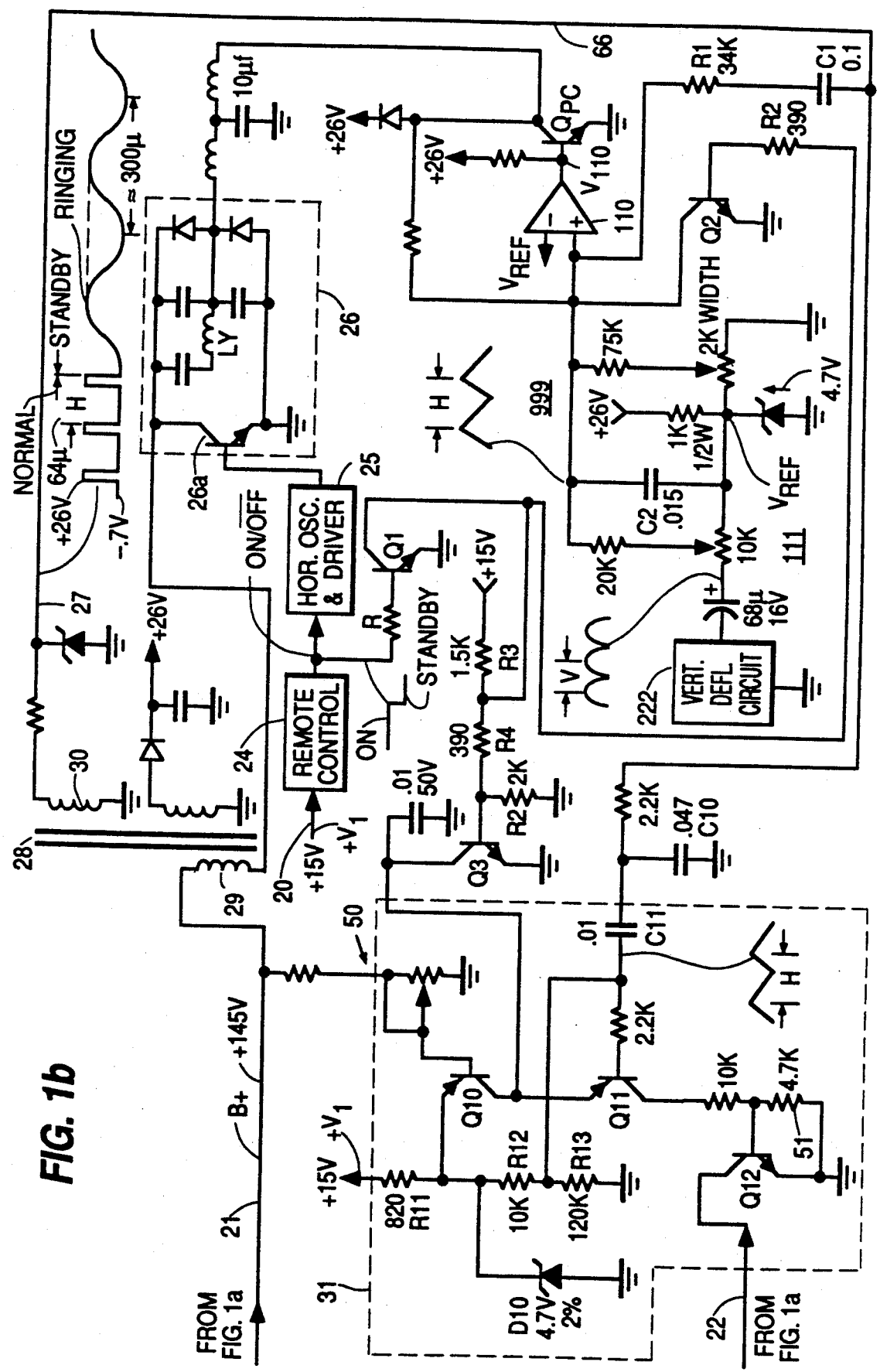

FIG. 1b discloses a second portion of the television receiver circuit which is coupled to the first portion of the circuit illustrated in FIG. 1a. In particular, lines 10, 11 and 12 of FIG. 1a are coupled to lines 20, 21 and 22 of FIG. 1b respectively. Furthermore, FIG. 1b includes a remote control receiver 24 which produces an ON signal or an OFF, standby signal depending upon the mode of operation selected by the user. This control device can include a microprocessor. When the ON signal is produced by the controller indicating the normal mode of operation, the horizontal oscillator and driver 25 begins to produce horizontal line pulses to be coupled to a conventional deflection circuit 26. Circuit 26 includes a horizontal deflection winding LY and a switching transistor 26a. Circuit 26 produces horizontal line pulses of a horizontal rate switching signal 66 upon line 27 by a flyback transformer 28 via a winding 30. The horizontal line rate pulses of signal 66 are then provided to the pulse width modulator 31 via an integrating network comprising a resistor R10 and a capacitor C10. The pulse width modulator 31 outputs pulse-width-modulated pulses to line 22 which are received as inputs at line 12 of FIG. 1a. These pulses are then transferred via transformer 23 to line 17 coupled to pin 2 indicating to primary circuit 10 that the normal mode of operation is required.

Pulse-width-modulator 31 operates to provide pulse width modulated pulses to control the supply voltage regulation by the switch mode regulator power supply shown in FIG. 1a.

If the 145 V B+ supply that is referenced to the cold ground begins to rise, the rise in voltage is coupled via a voltage divider 50 to the base of transistor Q10, causing Q10 to conduct less heavily. The collector of Q10 is coupled to the emitter of Q11, to the base of which the integrated ramp signals from the secondary 30 are supplied. The reduction in the conduction of transistor Q10 reduces the emitter voltage of Q11, causing transistor Q11 to turn ON or OFF at a lower base voltage, thereby providing narrower positive going pulses at the Q11 collector across resistor 51. These, in turn, turn ON transistor Q12 accordingly, inverting the pulses at the output of the collector of Q12 which are supplied to coupling transformer 23. Integrated circuit 1 uses the pulse width duty cycle of the pulses at connection 2 to control the ON and OFF time of transistor $Q_C$ to bring the B+ supply voltage down by turning transistor $Q_C$ ON for a shorter time. The lower voltage +V1 supply will track the B+ supply and will also accordingly, be regulated.

If the B+ supply decreases, the reverse situation occurs, with transistor Q10 conducting more, raising the emitter levels of transistor Q11, and changing the time period over which transistor Q11 conducts. This pulse width modulated signal at the collector of Q11 is provided via Q12 and transformer 23 to circuit 1, causing chopper transistor $Q_C$ to turn ON for a longer duration, driving the supply voltage B+ upward. Voltage V1, of course, tracks the B+ level and also rises.

A vertical deflection circuit 222 is coupled to a noninverting input of a comparator 110 of a pincushion distortion correction circuit 999. Signal 66 is also coupled to comparator 110 via a series RC connection of R1 and C1 which are coupled to line 27. The voltage appearing at the noninverting input of the comparator 110 is compared to a reference voltage $V_{REF}$ to produce an output voltage $V_{110}$, which is coupled to the base of switching transistor $Q_{PC}$. The horizontal pulse signal on line 27, signal 66, is coupled via AC coupling capacitor C1 and is integrated in a ramp capacitor C2. This circuit configuration comprising of comparator 110 and transistor $Q_{PC}$ forms a switch mode East-West pincushion correction circuit.

When a transition to standby mode occurs, horizontal oscillator and driver 25 is disabled. Energy that is still stored in circuit 26 produces ringing in signal 66 during a few milliseconds that follow. The ringing signals are developed upon line 27 to thereby provide pulses to the pulse width modulator 31 as well as to the switch mode East-West pincushion correction circuit 999

Assume, for explanation purposes, that the pulse width modulator 31 were permitted to react to these ringing signals. Therefore, modulator 31 could begin to provide spurious pulse width modulated output signals at a frequency corresponding to a low frequency of the ringing signals of signal 66. These spurious signals could be coupled to the chopper transistor $Q_C$ and $Q_{PC}$ and might induce very high current pulses in these transistors potentially damaging them. For example, the peak current in such transistors might exceed 1A.

Therefore, the present invention introduces active turnoff switching capabilities which result in actively turning off the pulse width modulator 31 so as to prevent the ringing signals at a frequency such as 3 KHZ that is substantially lower than the horizontal frequency, from generating pulses which would otherwise ultimately be received by the primary circuit 1. Furthermore the circuit also suppresses any effect of the ringing signals on transistor $Q_{PC}$.

In the present invention, a transistor Q1 is provided having its emitter grounded and its base coupled, via resistor R, to the output of the remote control receiver circuit 24. As a result, the ON/OFF state of transistor Q1 is determined by the output of the remote control receiver circuit 24. The collector of transistor Q1 is coupled to the base of transistor Q2 via resistor R2 and is also coupled to the base of transistor Q3 via the resistor network of R3, R4 and R5. Resistor R3 provides the collector voltage for Q1. When Q1 is turned ON by the remote control receiver circuit 24, which produces an ON signal to the base of Q1 that is a voltage sufficient to bias transistor Q1 ON, transistor Q1 is turned ON and transistors Q2 and Q3 are cut OFF. Thus the path from collector to emitter of each of these two transistors Q2 and Q3 is effectively an open circuit having little or no impact on the circuits which are connected to their respective collectors.

In particular, the collector of transistor Q3 is coupled to the collector-emitter coupling of transistors Q10 and Q11 of the pulse width modulator 31. The collector of transistor Q2 is coupled to the noninverting input of the comparator 110 of the pincushion correction circuit 999. In the normal mode of operation therefore, transistors Q2 and Q3 have no effect on either the pulse width modulator 31 or the comparator 110 of the switch mode East-West pincushion correction circuit. Therefore, the horizontal pulses appearing on line 27 are received by the ramp generator constituted by the resistor-capacitor combination R10-C10 to produce a ramp signal at the base of transistor Q11. This ramp signal is used to produce a sequence of pulse width modulated pulses, as previously described. The transistor configuration of Q10, Q11 and Q12 results in an output of a pulse signal on line 22 to line 12 of FIG. 1a. Furthermore, the pincushion correction circuit operates as if Q2 did not exist in the circuitry.

However, when the remote control indicates that the user has selected the standby mode of operation, transistors Q2 and Q3 become conductive. In particular, when the output of the remote control goes to a low signal, indicative of the standby mode, transistor Q1 is cut off. When transistor Q1 is cut off, transistors Q3 and Q2 are turned ON. This actively turns off or disables the PWM circuit 31 protecting transistor $Q_C$ and causing the switch mode regulation to regulate from the primary side and also actively protects the switch mode East-West pincushion transistor $Q_{PC}$.

With respect to the active disabling of the pulse width modulator, once Q3 is turned ON, the collector-emitter coupling of Q10 and Q11 is pulled to ground thus preventing the ringing signals received from line 27 which have been converted into ramp pulses by ramp generator R10-C10, from being coupled to terminal 2 of circuit 1 of primary circuit 10. This is done by providing a current path from the collector of Q10 and the emitter of Q11 to ground through transistor Q3. When Q3 turns ON, the emitter of transistor Q11 approaches ground effectively turning it OFF. Note that transistor Q11 base is biased positively by resistor-diode voltage divider comprising R11, R12, R13 and Zener diode D10, ensuring cut-off.

The effect of any ringing pulses on line 27 on the voltage at the base of transistor $Q_{PC}$ is also eliminated by establishing a path to ground for the positive terminal of the comparator 110 through the collector and emitter of transistor Q2. This prevents a ramp voltage that would have otherwise produced by the ringing signals and the ramp generator resistor R1 and capacitor C2 from developing at the positive input of the comparator 110 which would be sufficient so as to generate wide current pulses at the base of transistor $Q_{PC}$. Thus, the transistor of this switch mode East-West pincushion correction circuit is protected against extended exposure to high current and a transistor having a lower power tolerance can be used as this element.

The PWM is disabled from producing wide pulses which would otherwise produce wide current pulses in the chopper transistor $Q_C$. Therefore, the chopper transistor is also protected against exposure to high current and a transistor having a lower power tolerance can be used as this element.

What is claimed is:

1. A video display apparatus, comprising:
 a source of an on/off control signals that is indicative when operation in a standby mode is required and when operation in a run mode is required;
 a horizontal deflection circuit output stage responsive to said on/off control signal for generating a second control signal having signal transitions during said run mode and during a first interval that follows a change in said on/off control signal to said standby mode of operation such that, during said standby mode operation following said first interval, the signal transitions in said second control signal cease;
 a source of modulation signal; and
 an East-West raster distortion modulator responsive to said modulation signal, having first and second terminals coupled to receive said on/off and second control signals, respectively, and having an output terminal coupled to a control terminal of a transistor for producing a pulse-width modulated switching operation in said transistor during said run mode operation that modulates a deflection current in an East-West manner such that, during said transition interval, the switching operation in said transistor is disabled via said first terminal by the operation of said on/off control signals, and such that during said standby mode operation following said first interval, the switching operation is disabled via at least said second terminal by the operation of said second control signal.

2. A video display apparatus, comprising:
a source of an on/off control signal that is indicative when operation in a standby mode is required and when operation in a run mode is required;
a deflection circuit output stage responsive to said on/off control signal for generating a second control signal having signal transitions during said run mode and during a first interval that follows a change in said on/off control signal to said standby mode of operation such that, during said standby mode operation following said first interval, the signal transitions in said second control signal cease;
a source of a third control signal at a frequency that is related to a deflection frequency; and
a pulse-width modulator responsive to said control signal, having first and second terminals coupled to receive said on/off and second control signals, respectively, and having an output terminal coupled to a control terminal of a transistor for producing a pulse-width modulated switching operation in said transistor during said run mode operation that controls a deflection current amplitude in accordance with said control signal such that, during said transition interval, the switching operation in said transistor is disabled via said first terminal by the operation of said on/off control signal, and such that during said standby mode operation following said first interval, the switching operation is disabled via at least at said second terminal by the operation of said second control signal.

3. A video display apparatus, comprising:
a source of an on/off control signal that is indicative when operation in a standby mode is required and when operation in a run mode is required;
a deflection circuit output stage;
a first on/off switch coupled to said output stage and responsive to said on/off control signal for enabling operation of said output stage during said run mode and for disabling operation thereof during said standby mode operation;
a source of modulation signal;
a second on/off switch responsive to said on/off control signal, said second on/off switch having a first switching state during said standby mode and a second switching state during said run mode; and
an East-West raster distortion modulator stage coupled to said second on/off switch and to said modulation signal source, said modulator being enabled by said second on/off switch during said run mode to provides East-West deflection current modulation, said modulator stage being actively disabled by said second on/off switch when said standby mode is asserted.

4. A video display apparatus, comprising:
a source of an on/off control signal that is indicative when operation in a standby mode is required and when operation in a run mode is required;
a deflection circuit output stage;
a first on/off switch coupled to said output stage and responsive to said on/off control signal for enabling operation of said stage during said run mode and for disabling operation thereof during said standby mode operation;
a source of a second control signal at a frequency related to a deflection frequency;
a second on/off switch responsive to said on/off control signal, said second on/off switch having a first switching state during said standby mode and a second switching stage during said run mode; and
means coupled to said second on/off switch and to said second control signal source for varying a deflection current in said output stage in accordance with said second control signal during said run mode, said deflection current varying means being actively disabled by said second on/off switch when said standby mode is asserted.

* * * * *

UNITED STATES PATENT AND TRADEMARK OFFICE
CERTIFICATE OF CORRECTION

PATENT NO.   : 5,017,844
DATED        : May 21, 1991
INVENTOR(S)  : JEFFERY BASIL LENDARO

It is certified that error appears in the above-identified patent and that said Letters Patent is hereby corrected as shown below:

Col. 7, line 7        delete "transition" and substitute -- first --.

Col. 7, line 29       before "control" insert -- third --.

Col. 7, line 37       before "control" insert -- third --.

Col. 7, line 38       delete "transition" and substitute -- first --.

IN THE DRAWINGS:

FIGURE 1b             delete reference "111".

Signed and Sealed this

Fourth Day of May, 1993

Attest:

MICHAEL K. KIRK

Attesting Officer

Acting Commissioner of Patents and Trademarks